United States Patent
Hofmann

[15] 3,667,303
[45] June 6, 1972

[54] CONTROL TRANSMISSION
[72] Inventor: Detlef Hofmann, Eutinger Strasse 7531, Kieselbronn, Germany
[22] Filed: Dec. 29, 1970
[21] Appl. No.: 102,454

[30] Foreign Application Priority Data
Dec. 29, 1969 Germany..................P 19 65 279.0

[52] U.S. Cl..................................74/190, 74/216
[51] Int. Cl..................F16h 15/04, F16h 55/34, F16h 15/16
[58] Field of Search..................74/190, 198, 214, 216

[56] References Cited

UNITED STATES PATENTS 3,183,741  5/1965  Freeman..........................74/198 X

FOREIGN PATENTS OR APPLICATIONS 248,297  10/1962  Australia.........................74/190

Primary Examiner—Leonard H. Gerin
Attorney—Walter Becker

[57] ABSTRACT

An infinitely variable transmission, which includes an input shaft with a first friction member and an output shaft with a second friction member while one of said friction members is formed by a sleeve with a conical bore and the other friction member is formed by an egg-shaped body of revolution extending into said conical bore and in firm contact with the wall defining said bore for frictional engagement and rotation with said sleeve, said body of revolution being tiltable with regard to the axis of said sleeve for varying the transmission ratio between said input and output shafts.

15 Claims, 3 Drawing Figures

CONTROL TRANSMISSION

The present invention relates to an infinitely variable control transmission which comprises an input shaft and an output shaft which shafts are interconnected through the intervention of friction elements with infinitely variable diameters rolling upon each other.

Transmissions of this type are generally designated as friction wheel transmissions and are known in various designs. As a rule, bevel gears are employed which either roll upon each other, if necessary through the intervention of a wheel or are interconnected by a pulling element, for instance a V-belt or chain, in such a way that in response to an axial movement of the bevel gears or the interposed wheel, the rolling off diameter changes on the input side as well as on the output side. Transmissions of this type require relatively many elements, especially in view of the necessary torque-responsive pressing of the friction elements against each other, and consequently have a corresponding overall size.

Such infinitely variable transmissions are employed in particular where a predetermined speed has to be maintained in a precise manner, if necessary, also while the load changes. Generally, the adjusting range of such transmissions can be kept relatively small since they merely have to bring about that the speed can be adjusted around a certain rated value while the rated speed itself is determined by non-adjustable transmissions. This applies in particular to machine tools but such transmissions may also be used for machines which are speed responsive to a high degree, as for instance wrapping machines, etc. Particularly with this type of machines, these relatively large control transmissions can be mounted only under considerable difficulties so that expensive solutions have to be resorted to or the driving system has to be completely changed, for instance, to variable electronic driving systems. Another drawback of these heretofore known transmissions consists in the considerable wear of the friction elements, particularly when no or only an incomplete torque responsive pressing prevails.

It is, therefore, an object of the present invention to provide an infinitely variable transmission comprising an input shaft and an output shaft interconnected by friction elements with infinitely variable diameter adapted to roll upon each other, which will overcome the above mentioned drawbacks.

This object and other objects and advantages of the invention will appear more clearly from the following specification in connection with the accompanying drawings, in which:

FIG. 1 diagrammatically illustrates a section through a transmission according to the present invention with a transmission ratio 1 : 1;

Figure 1:
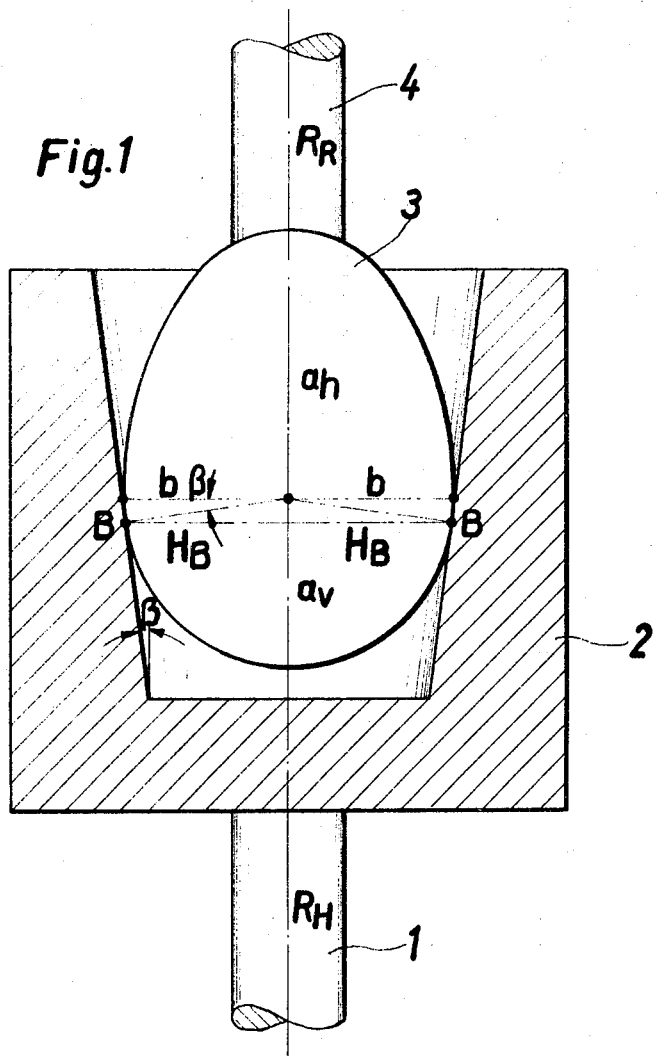

The transmission according to the present invention is characterized primarily in that the friction elements or members are in the form of a conically bored sleeve coaxial with the pertaining shaft axis and by an elliptoidal body of revolution arranged in said sleeve and adapted to be pivoted out of the axis of said sleeve, while the axis of rotation pertaining to the body of revolution and located in the large axis is in alignment with the pertaining shaft whereas the body of revolution is formed of ellipsoids merging with each other in a continuous manner in such a way that the total of the large semiaxes of its front portion is less than that rear portion which starts at the largest small semiaxis. The transmission according to the present invention is furthermore characterized in that the semiaxis of the lower point of contact of the body of revolution with the sleeve with reference to its axis of rotation is always less than the corresponding upper semiaxis.

With the infinitely variable transmission according to the present invention, therefore, in contrast to customary transmissions no conical discs are employed, but an ellipsoidal body of revolution rolls in a conical bore. As a result thereof not only will the material be prevented from escaping but there will always be assured a constant good torque-responsive pressing of the two friction members against each other while the overall size is of a minimum. The control possibility of the transmission depends on the flank angle of the conical bore which may change continuously in a positive or negative direction, and furthermore depends on the design of the body of revolution, while the transmission generally has a transmission ratio of 1 : 3. The transmission ratio is obtained in view of the fact that starting with a transmission ratio of 1 : 1 at a direct coupling of the two friction members with the axes thereof in alignment, by pivoting the body of revolution out of the axis of the sleeve always smaller diameters in the conical bore will roll upon each other with a simultaneously increased width of the bore so that with a corresponding selection of the sleeve as drive, a step-up transmission will be obtained at the output. The torque-dependent pressure at which the friction members are pressed against each other is aside from a constant preloading force, for instance by a spring, as is customary with these transmissions, obtained due to the fact that the body of revolution has the tendency to pull itself into the sleeve and in this connection slightly to deform the friction material within the elastic range. This deformation and thus also the static friction is torque-dependent so that with a correct design of the transmission a slippage of the friction members will not occur. Expediently, the flank angle of the conical bore is so designed that it will be proportional to the static friction of the material employed for the sleeve and the body of revolution and will be inversely proportional to the specific torque to be transmitted. If thus material is employed with a high static friction factor, the flank angle may be correspondingly large whereas for purposes of transmitting a high specific torque, a relatively small flank angle will be necessary.

The ellipsoidal body of revolution may be selected within relatively wide limits but it is suggested so to select the ratio between the larger and the smaller axis of the body of revolution that this ratio continuously increases from the front to the rear. In such an instance the adjustment by the linear pivoting of the body of revolution out of the axis of the sleeve will be effected approximately linearly. Advantageously, the ratio of these axes with regard to each other starts with the ratio 1 so that the front portion starts as a hemisphere. For purposes of simplifying the manufacture of the transmission, also the entire front portion of the body of revolution may be a hemisphere which is followed by an ellipsoidal portion of a body of revolution. The body of revolution may also be so designed that the hemisphere from its diameter at the plane of contact with the sleeve will with the axes in alignment merge from the sleeve and the body of revolution in a non-continuous manner with the rear portion of the body of revolution. While in this instance a speed step will result when the adjustment is effected from 1 : 1 to 1 : n, there will nevertheless be obtained a snug engagement of the body of revolution in the sleeve at the speed 1 : 1 at which a torque-dependent pressing will be lacking.

In order to assure that the input and output shaft can be arranged parallel to each other in a housing, it is suggested to arrange two infinitely variable transmissions of the above mentioned type one behind the other whereby simultaneously the range of adjustment is increased.

The very high specific transmission outputs made possible according to the present invention will generally make it necessary that the friction members run in oil. A difficulty encountered in this connection consists in the pivoting of the body of revolution out of the sleeve axis or, in other words, the oil-tight closure of the pertaining shafts. In order to meet this problem and in addition thereto to obtain a simple adjusting possibility, it is suggested according to the present invention that the input and output shafts are respectively encased in a pipe member receiving the shaft bearings while the end faces of the pipe members which abut against each other are slanted at half the maximum pivot angle of the input shaft with regard to the output shaft, and while the abutting areas are sealed and equipped with a device for turning the pipe members relative to each other. Such a device may, for instance, be formed by a worm drive which will make it possible to adjust the transmission in a very fine manner. If the spiral movement of the shaft of the body of revolution as brought about by the device according to the invention is not desired when adjusting the transmission, also a wedge-shaped slanted intermediate pipe may be interposed between the two slanted pipe members. By turning said wedge-shaped slanted intermediate pipe, the shaft of the body of revolution will again be pivoted but in a plane which passes through the two shafts. It is a matter of course that also in this instance the abutting areas of the pipe members are correspondingly sealed so that it will be possible to permit the friction members to run in oil.

It is very expedient so to design the sleeve and the body of revolution that they can be exchanged on the shafts at any desired time. In this way, at a certain load direction, a step-up and step-down transmission ratio will be obtained.

According to a further development of the invention, it is also possible to design the sleeve so that it can be removed from the body of revolution. In this way an additional coupling possibility is obtained which makes it possible to preselect a desired speed by pivoting the shaft of the body of revolution and only then to engage the two friction members with each other.

Advantageously, the transmission according to the invention may be designed as a control transmission according to which the torque-dependent force which urges the body of revolution into position with the aligned shafts may act only against a variable adjusting force. Depending on the selection of the input and output drive, an increase in the torque or speed as control factor may be preselected. For purposes of obtaining an increased control range, it is advantageous in this connection to make the shaft of the body of revolution slightly elastic so that a corresponding stroke of the body of revolution in the direction of the sleeve axis will be made possible.

Referring now to the drawings in detail and FIG. 1 thereof in particular, a conically bored sleeve 2 is mounted on a shaft 1 coaxial to the axis of rotation $R_H$. The flank angle of the conical bore 2' is designated with $\beta$. Arranged in sleeve 2 is an ellipsoidal body of rotation 3 provided with a shaft 4; the large axes of the ellipsoidal body 3 coincide with the axis of rotation $R_R$ and the shaft axis. According to the showing in the drawing of FIG. 1, the sleeve axis $R_H$ and the axis of rotation $R_R$ of the body of revolution 3 are in alignment with each other. In this way a direct coupling of the two friction members is obtained with an annular contact of the body of revolution 3 in sleeve 2 at the line B—B. The illustrated ellipsoidal body of rotation 3 has a hemispherical front portion with the radius $b$ and a large axis $a_r = b$. The large axis $a_h$ of the rear portion is longer than the axis $a_r$ of the front portion whereby a substantially egg-shaped configuration is obtained for the body of revolution 3. The two radii $H_B$ defined by the distance between the contact points of body 3 with the wall of conical bore 2' and the common axis of ratition $a_r - a_h$ are in this extreme position with direct coupling equal to each other.

Figure 2:
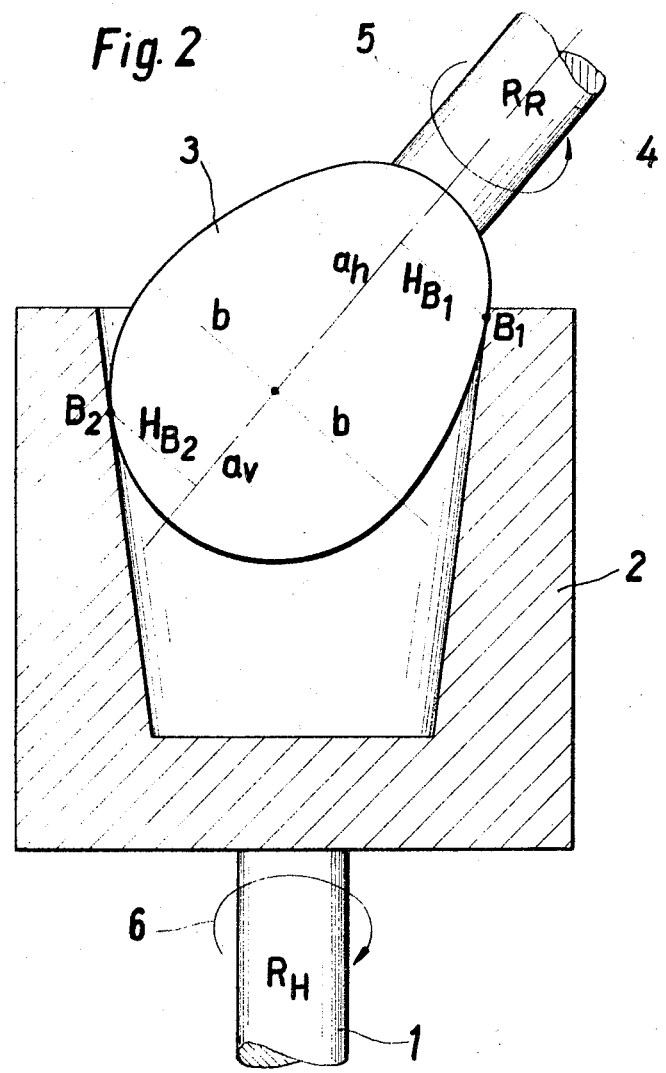
FIG. 2 is a section similar to that of FIG. 1 showing a transmission according to the invention with a transmission ratio 1 : n.

Referring now to FIG. 2, similar to the arrangement shown in FIG. 1, there is again illustrated sleeve 2 with its shaft 1. However, in this instance the body of revolution 3 has been pivoted relative to the sleeve axis $R_H$. In this way a contact line $B_1-B_2$ is obtained with the upper and lowermost points located on two different planes. In response to a rotary movement of shaft 4 in turning direction 5, the body of revolution 3 rolls on the roller path defined by the line $B_1-B_2$, and in this way it carries along the sleeve 2 or shaft 1 in the turning direction 6. Inasmuch as the radii $H_{B1}$; $H_{B2}$ along the contact line $B_1-B_2$ with regard to the axis of rotation $R_R$ of the body of revolution 3 are shorter than in the directly coupled position shown in FIG. 1, the sleeve 2 will, when the drive is effected by shaft 4 of the body of revolution 3, turn slower relative to the direct coupling.

Figure 3:
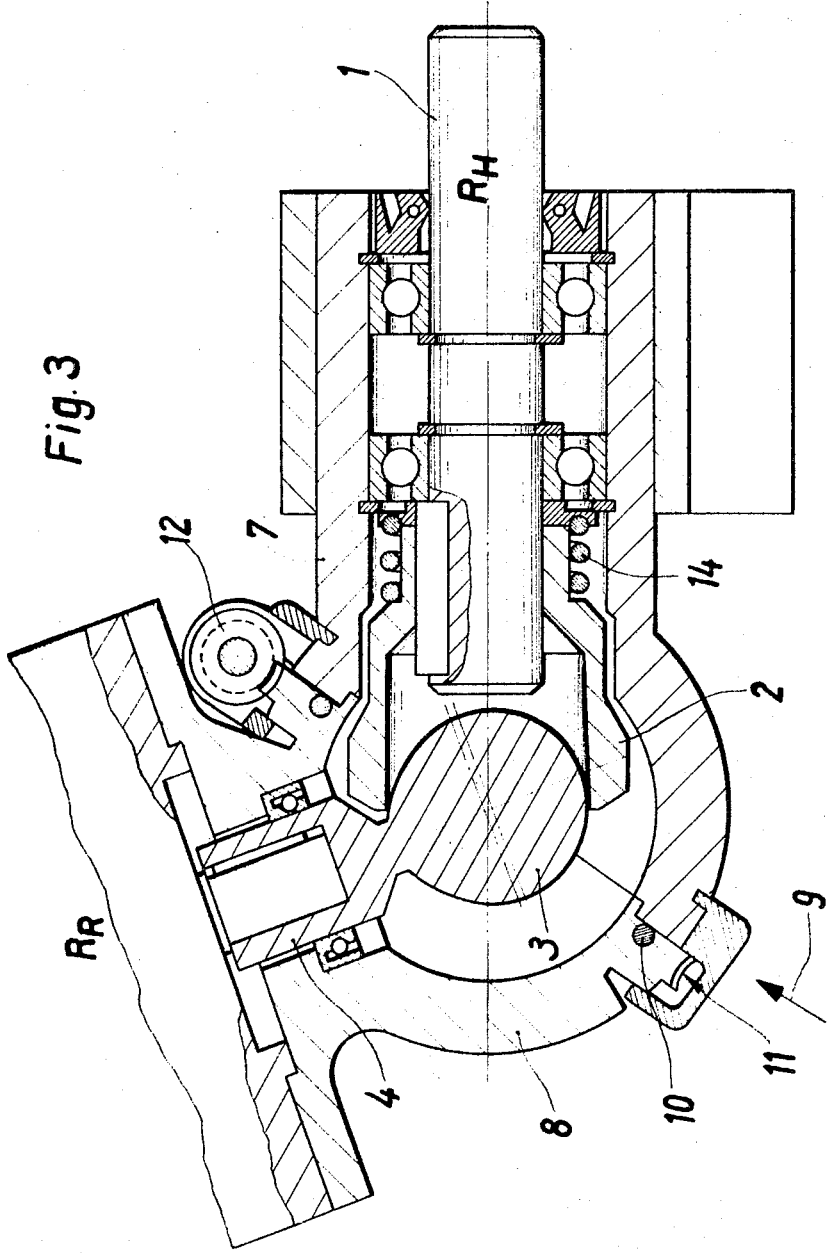
FIG. 3 illustrates a section through an embodiment of the invention with shafts encases in pipe members.

Finally, FIG. 3 shows an embodiment of a transmission according to the invention in which the friction members 2, 3 have their shafts 1, 4 journalled in pipe sections 7, 8. The pipe sections 7, 8 are slidingly guided upon each other in a plane 9, which corresponds to half the maximum pivot angle between the axes $R_H$ and $R_R$, and are sealed toward the outside by an O-ring 10. The pipe section 8 is provided with a gear ring 11 adapted to be engaged by a worm drive 12. By turning the worm drive 12, the pipe section 8 is turned in plane 9 so that the axis of rotation $R_R$ will, after a pivoting movement of the pipe section 8 by 180°, be in alignment with the sleeve axis $R_H$.

It is, of course, to be understood that the present invention is, by no means, limited to the particular arrangement shown in the drawings but also comprises any modifications within the scope of the appended claims.

What I claim is:

1. An infinitely variable transmission, which includes: an input shaft, an output shaft, a first friction member connected to said input shaft for movement therewith, a second friction member connected to said output shaft for movement therewith, one of said friction members forming a sleeve with a conical bore coaxial with the shaft connected thereto and the other one of said friction members forming an elipsoidal body of revolution having a longer primary axis of revolution in axial alignment with the shaft connected thereto and also having a secondary axis of revolution shorter than and substantially perpendicular to said primary axis of rotation, said body of revolution being movable selectively in the direction into and out of said sleeve while remaining in frictional engagement with said sleeve so that said body and said sleeve will be rotatable together while permitting an infinitely variable speed ratio between said body of revolution and said sleeve, said body of revolution being formed of a plurality of elipsoidal sections merging with each other in a continuous manner in such a way that the total of those primary axis sections which are located between said secondary axis and that point of said primary axis which is located deepest in said conical bore is less than the total of those primary axis sections which are located between said secondary axis and that point of said primary axis which is remotest from said secondary axis, the primary axis of rotation of said body of revolution selectively being shiftable relative to the axis of rotation of said sleeve from a position in which they are in axial alignment with each other into a plurality of angular positions in each of which positions the distance between the innermost contact point of said body of revolution with said conical bore and said primary axis is less than the distance between the outermost contact point of said body of revolution with said sleeve and said primary axis.

2. A transmission according to claim 1, in which the flank angle of the conical bore of said sleeve is proportional to the static friction of the material of which the sleeve and the body of revolution are made and is inversely proportional to the specific torque to be transmitted.

3. A transmission according to claim 1, in which the ratio of the primary axis of revolution to the secondary axis of revolution increases steadily from that end of the body of revolution which is adjacent to the shaft connected thereto toward the opposite end of said body of revolution.

4. A transmission according to claim 3, in which said ratio starts with the ratio 1.

5. A transmission according to claim 1, in which that portion of the body of revolution which is adjacent to the shaft connected thereto is of hemispherical shape.

6. A transmission according to claim 5, in which the hemispherical portion of said body of revolution merges in a non-steady manner with the adjacent portion of the body of revolution ahead of the diameter line of the circle along which said body of revolution contacts the wall of the conical bore in said sleeve when the primary axis of said body of revolution coincides with the axis of rotation of said sleeve.

7. A transmission according to claim 1, in which when the primary axis of said body of revolution coincides with the axes of revolution of said sleeve the point of contacts of said body of revolution with the walls of said conical bore are located on a circle the plane of which is substantially perpendicular to said primary axis and contain said secondary axis.

8. A transmission according to claim 1, which comprises two identical transmission units arranged one behind the other with parallel input and output shafts.

9. A transmission according to claim 1, which includes two pipe sections respectively housing at least a portion of said body of revolution and at least a portion of that one of said two shafts which is not directly connected to said body of revolution, said pipe sections respectively having one of their end faces in abutting engagement with each other, said input and output shafts being tiltable from a position in which said input and output shafts are in axial alignment with each other to a position in which they define a maximum angle with each other, and in which those end faces of said pipe sections which abut each other are slanted with regard to the axis of one of said shafts by an angle equaling half the maximum possible tilting angle between both of said shafts, sealing means at said abutting end faces, and means operatively connected to one of said pipe sections for selectively effecting a rotary movement of one of said pipe sections relative to the other one of said pipe sections.

10. A transmission according to claim 1, which includes two main pipe sections respectively surrounding at least a portion of said body of revolution and at least a portion of that one of said two shafts which is not directly connected to said body of revolution, said main pipe sections respectively having one end face slanted with regard to the longitudinal axis of one of said shafts, while said slanted end faces are arranged opposite to each other in spaced relationship to each other, and an intermediate pipe section interposed between the slanted end faces of said two main pipe sections and in abutting engagement with the slanted end faces of said two main pipe sections.

11. A transmission according to claim 1, in which said sleeve and said body of revolution are exchangeably connected to their respective shafts.

12. A transmission according to claim 1, in which said sleeve is adapted to be lifted off the body of revolution in the axial direction of the latter.

13. A transmission according to claim 1, in which said sleeve is arched in the manner of a chalice.

14. A transmission according to claim 1, in which the body of revolution is adapted to be tilted from a position in which said shafts define an angle with each other into a position in which said shafts are in axial alignment with each other against an adjustable control force.

15. A transmission according to claim 14, in which said adjustable control force is formed by a spring.

* * * * *